(12) United States Patent
Hegde et al.

(10) Patent No.: US 8,661,156 B2
(45) Date of Patent: Feb. 25, 2014

(54) TRANSPORT LAYER CONNECTION

(75) Inventors: Nikhil Hegde, Round Rock, TX (US);
Prashant Anant Paranjape, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 12/951,714

(22) Filed: Nov. 22, 2010

(65) Prior Publication Data

US 2012/0131210 A1    May 24, 2012

(51) Int. Cl.
*G06F 15/173* (2006.01)

(52) U.S. Cl.
USPC ............................ 709/238; 270/352; 270/392

(58) Field of Classification Search
USPC .................................... 709/228; 370/392, 352
See application file for complete search history.

(56) References Cited

U.S. PATENT DOCUMENTS

| | | | |
|---|---|---|---|
| 6,567,405 B1 | 5/2003 | Borella et al. | |
| 6,697,354 B1 * | 2/2004 | Borella et al. | 370/352 |
| 7,171,492 B1 * | 1/2007 | Borella et al. | 709/245 |
| 7,450,560 B1 * | 11/2008 | Grabelsky et al. | 370/352 |
| 7,653,746 B2 * | 1/2010 | Touch et al. | 709/245 |
| 2003/0128843 A1 * | 7/2003 | Brown et al. | 380/46 |
| 2005/0210258 A1 * | 9/2005 | Birrell et al. | 713/178 |
| 2006/0136634 A1 * | 6/2006 | Gardner | 710/107 |
| 2012/0191866 A1 | 7/2012 | Hegde et al. | |

* cited by examiner

*Primary Examiner* — Anh-Vu Ly
*Assistant Examiner* — Hashim Bhatti
(74) *Attorney, Agent, or Firm* — Yee & Associates, P.C.; David A. Mims, Jr.

(57) ABSTRACT

A system identifies a network socket on a machine by assigning a non-IP address socket anchor and a port number to the network socket. A socket anchor may comprise a globally unique number. In some embodiments, a socket anchor comprises a number having a preselected number of bits. The number having the preselected number of bits may comprise a selected number associated with the machine concatenated with a number of randomly generated bits. The number of bits of the selected number plus the number of randomly generated bits is equal to the preselected number of bits. In some embodiments, the selected number associated with the machine is a Media Access Control (MAC) address of a network interface associated with the machine.

14 Claims, 7 Drawing Sheets

| SOURCE PORT | 501 | DESTINATION PORT | 502 |
|---|---|---|---|
| SEQUENCE NUMBER 503 ||||
| ACKNOWLEDGEMENT NUMBER 504 ||||
| DATA OFFSET 505 | RESERVED 506 | FLAGS 507 | WINDOW SIZE 508 |
| CHECKSUM 509 || URGENT POINTER 510 ||
| KIND 511 | LENGTH 512 | IP-ASSOCIATION 513 ||
| SOURCE SOCKET ANCHOR 514 ||||
| KIND 515 | LENGTH 517 | IP-ASSOCIATION 518 ||
| DESTINATION SOCKET ANCHOR 519 ||||

| VERSION 601 | HEADER LENGTH 602 | DIFFERENTIATED SERVICES 603 | TOTAL LENGTH 604 ||
|---|---|---|---|---|
| IDENTIFICATION 605 ||| FLAGS 606 | FRAGMENT OFFSET 607 |
| TIME TO LIVE 608 | PROTOCOL 609 || HEADER CHECKSUM 610 ||
| SOURCE IP ADDRESS 611 |||||
| DESTINATION IP ADDRESS 612 |||||
| KIND 613 | LENGTH 614 || IP-ASSOCIATION 615 ||
| SOURCE SOCKET ANCHOR 616 |||||
| KIND 617 | LENGTH 618 || IP-ASSOCIATION 619 ||
| DESTINATION SOCKET ANCHOR 620 |||||

(600)

FIG. 6

TRANSPORT LAYER CONNECTION

BACKGROUND

The present invention relates generally to the field of data communication, and more particularly to systems and computer program products for establishing transport layer connections independent of Internet Protocol (IP) addresses.

A current trend in computing is toward virtualization using logical partitions (LPARs). An LPAR or virtual machine is the division of a computer's processors, memory, storage, and input/output into multiple sets of resources so that each set of resources can be operated independently with its own operating system instance and applications. As computers become more powerful, partitioning allows multiple virtual systems to run on one machine, thereby using the computer's resources more efficiently. Recently, virtualization technology has been expanded with workload partitions (WPARs). WPAR technology allows administrators to virtualize operating systems, which allows for fewer operating system images on a partitioned server.

A process known as live partition mobility allows LPARs and WPARs, and their hosted applications, to be moved from one physical system to another without disrupting infrastructure services. The migration transfers the entire system environment, including processor states, memory, attached virtual devices, and connected users. Live partition mobility enables partitions to be moved off servers that are to be shut down for maintenance or repair without interrupting services to users. Live partition mobility also facilitates load and resource balancing over a system of networked servers.

Networks are typically divided into subnetworks. A subnetwork may represent all the machines at one geographic location, in one building, in the same department, or on the same local area network (LAN). All the computers that belong to a subnetwork are addressed with the same most-significant bit group in their Internet Protocol (IP) address, which is known as a routing prefix or network number.

Transport layer protocols, such as Transmission Control Protocol (TCP) and User Datagram Protocol (UDP), specify a source and destination port number in their headers. In a process known as binding, an application process associates its input or output channel file descriptors, which are known as sockets, with a port number and an IP address to send and receive data via a network. The operating system maps a socket to a particular application process or thread. The operating system forwards payloads of incoming sockets associated with applications by extracting the IP address from the IP header and the port number from the transport layer header.

When a partition is migrated from one subnetwork to another subnetwork, its IP address changes because the routing prefix or network number of the partition's IP address must change as the partition is migrated beyond its original network boundaries. However, the sockets of its processes continue to be identified by its original IP address. Accordingly, incoming cannot be routed properly.

BRIEF SUMMARY

Embodiments of the present invention provide systems and computer program products for enabling network communication between machines. A system according to one embodiment identifies a network socket on a machine by assigning a non-IP address socket anchor and a port number to the network socket. A socket anchor may comprise a globally unique number. In some embodiments, a socket anchor comprises a number having a preselected number of bits. The number having the preselected number of bits may comprise a selected number associated with the machine concatenated with a number of randomly generated bits. The number of bits of the selected number plus the number of randomly generated bits is equal to the preselected number of bits. In some embodiments, the selected number associated with the machine is a Media Access Control (MAC) address of a network interface associated with the machine.

A transport layer connection between a source machine and a destination machine is defined by a tuple comprising {transport protocol, source socket anchor, source port number, destination socket anchor, and destination port number}. When data is transmitted from the source machine to the destination machine according to embodiments of the present invention, the destination machine receives a packet at the transport layer of the destination machine's protocol stack. The packet includes a socket anchor and a port number. The transport layer forwards the data to the socket of the destination machine identified by the socket anchor and the port number. In some embodiments, the socket anchor is carried in a transport layer header of the packet. In other embodiments, the socket anchor is carried as an option in an Internet layer head of the packet.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 5 is block diagram of an embodiment a Transmission Control Protocol (TCP) header according to the present invention;

FIG. 6 is a flowchart of Internet Protocol (IP) header according to an alternative embodiment of the present invention;

DETAILED DESCRIPTION

Figure 1:
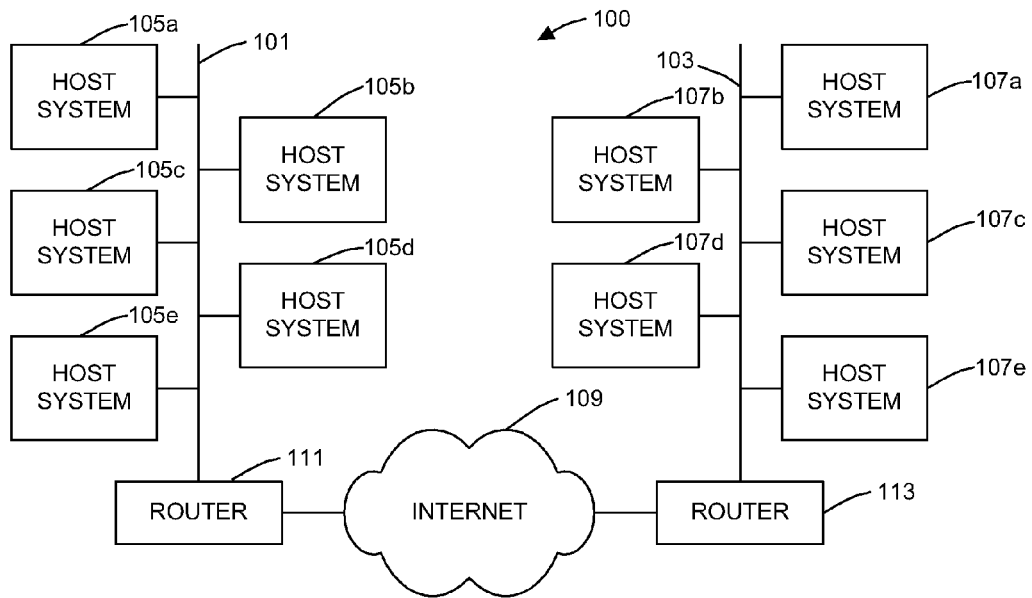
FIG. 1 is a block diagram of an embodiment of a system according to the present invention.

Referring now to the drawings, and first to FIG. 1, a system is designated generally by the numeral 100. System 100 includes a first network 101 and a second network 103. First network 101 interconnects a plurality of host systems 105. Similarly, second network 103 interconnects a plurality of host systems 107. Networks 101 and 103 may embody any suitable networking technology, such as Ethernet. Networks 101 and 103 may each be divided into one or more subnetworks. First network 101 is coupled to the Internet 109 though a router 111. Similarly, second network 103 is coupled to Internet 109 through a router 113.

Figure 2:
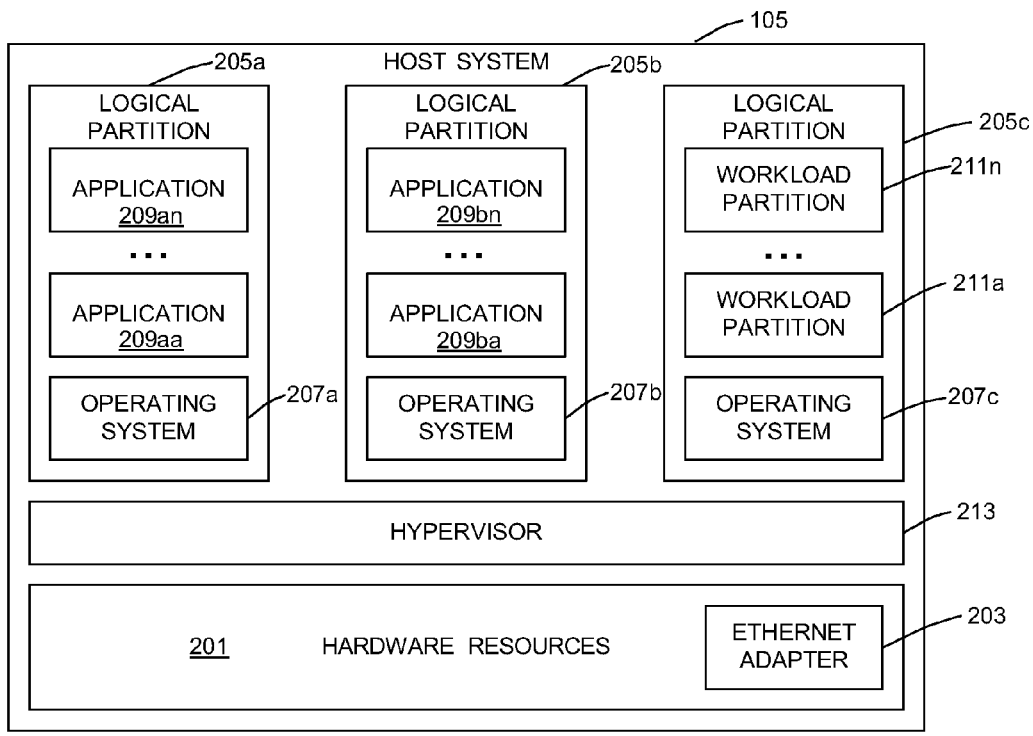
FIG. 2 is a block diagram of an embodiment host system according to the present invention.

FIG. 2 is a block diagram of a host system 105. Host system 105 includes various hardware resources, indicated generally at 201, an Ethernet adapter 203. Hardware resources 201 include other physical resources, such as processors, memory, and the like.

Host system 105 is a virtualized system in that it includes a plurality of logical partitions (LPARs) 205. A logical partition is a division of resources 201 of host system 105 a subset of resources so that each subset of resources can be operated independently with its own operating system instance and application or applications. Thus, LPARs 205 each include an operating system image 207. LPARs 205a and 205b each include applications 209 running on operating systems 207, respectively.

LPAR 205 includes workload partitions (WPARs) 211. A WPAR is a further division of the resources 201 of host system 105 into a subset of resources such that each subset can be operated independently with its own virtualized operating system image and applications. Inside WPAR 211, the application or applications (not shown) have private execution environments that are isolated from other processes outside WPAR 211.

Host system 105 includes a hypervisor 213. Hypervisor 213 is a software layer that provides the foundation for virtualization of host system 105. Hypervisor 213 enables resources 201 of host system 105 to be divided among the multiple LPARs 205 and WPARs 211, and it ensures strong isolation between them. Hypervisor 213 is responsible for dispatching the LPAR and WPAR workload across the physical processors. Hypervisor 213 also enforces partition security and it can provide inter-partition communication.

Figure 3:
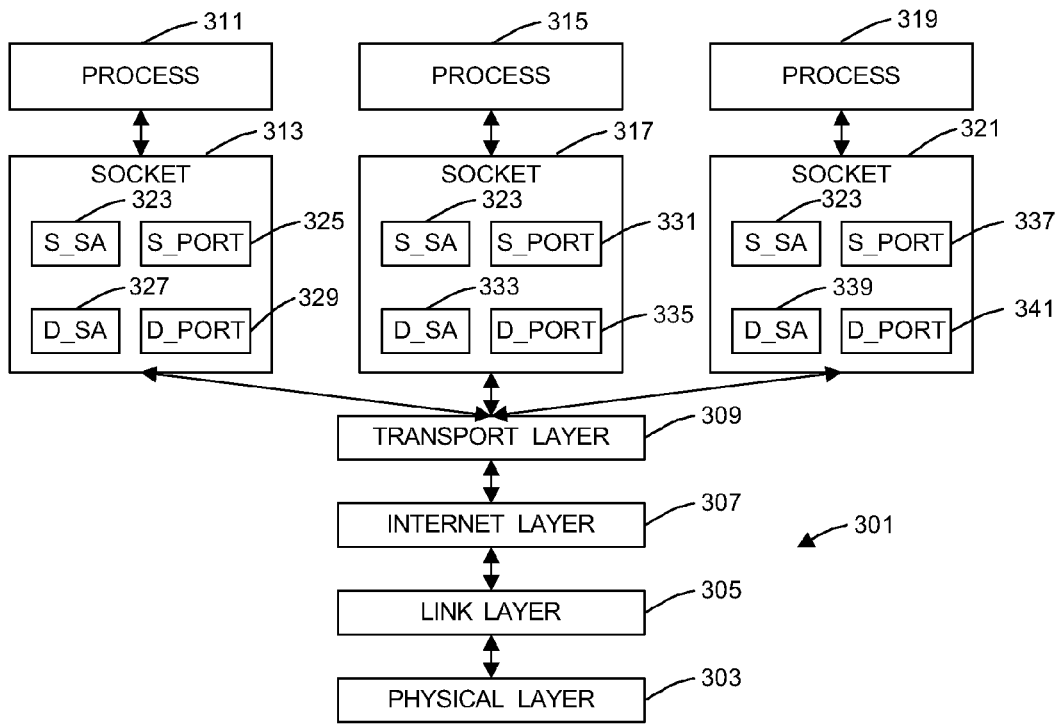
FIG. 3 is a block diagram of an embodiment of protocol stack processing according to the present invention.

Embodiments of the present invention enable end-to-end connections across Internet 109 between application processes running in LPARs 205 or WPARs 211. FIG. 3 illustrates the flow of information up and down a protocol stack 301 running in an LPAR. Protocol stack 301 is typically executable code and data structures associated with a kernel for an operating system 207 of an LPAR 205. The code resides in memory locations associated with the kernel. The data structures are portions of memory that are used by protocol stack 301 code to retain static and dynamic variables.

Figure 4:
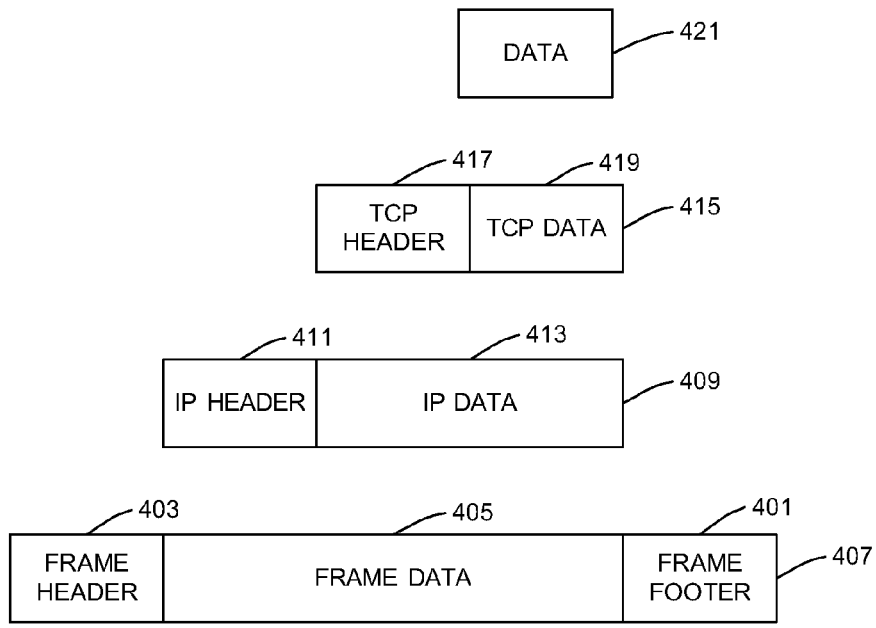
FIG. 4 illustrates data encapsulation through the protocol stack.
Figure 7:
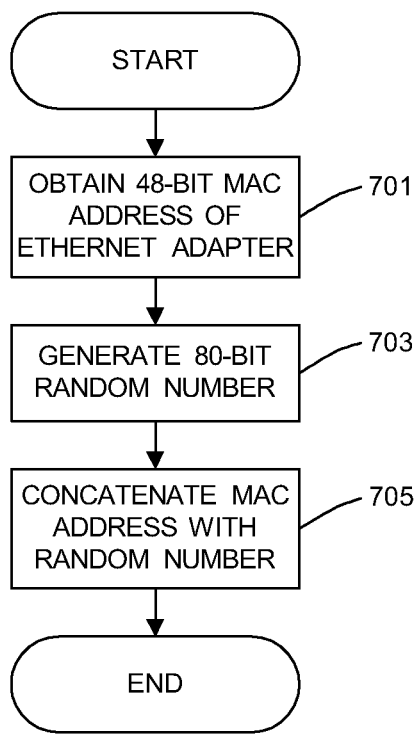
FIG. 7 is a flowchart of an embodiment of socket anchor generation according to the present invention.

The lowest layer of protocol stack 301 is physical layer 303. Physical layer 303 includes physical media interfaces, such as Ethernet adapter 203, that place data packets on, and receive data packets from, physical transmission media. Referring to FIG. 4, a data packet on the physical medium is a frame 401. Frame 401 includes a frame header 403, which includes a source Media Access Control (MAC) address and a destination MAC address. MAC addresses are 48-bit numbers that uniquely identify physical network interfaces, such as Ethernet adapter 203. Frame header 403 is followed by frame data 405, which includes payload data plus other protocol headers. Frame 401 ends with a frame footer 407, which includes a cyclic redundancy check that is used to detect any corruption of data in transit. Physical layer 303 passes frames 401 to a link layer 305.

Link layer 305 strips frame header 403 and frame footer 407 from frame data 405, which results in an Internet Protocol (IP) packet 409. IP packet 409 includes an IP header 411 and IP data 413. IP header 411 includes a source IP address and a destination IP address, as well as other information, such as time to live, transport layer protocol (e.g. Transmission Control Protocol (TCP) or User Datagram Protocol (UDP)), and header check sum. Link layer passes IP packet 409 to an Internet layer 307. Internet layer processes the information in IP header 411. Internet layer 307 strips IP header 411 from IP packet 409 to yield a Transmission Control Protocol (TCP) segment 415.

Internet layer 307 passes TCP segment 415 to transport layer 309. TCP segment 415 includes a TCP header 417 and TCP data 419. TCP header 417 will be described in detail hereinafter, but according to the present invention, TCP header 417 includes a new option kind called socket anchor. Generally, a socket anchor is a number that forms part of a socket identifier.

The operating system and application create a socket. Generally, a socket is a data structure in the kernel that provides an input and output channel for a process. The operating system maps a socket to a particular application process or thread. Thus, in FIG. 3, a process 311 is mapped to a socket 313; a process 315 is mapped to a socket 317; and a process 319 is mapped to a socket 321. Socket 313 is identified by a source socket anchor 323, a source port number 325, a destination socket number 327, and a destination port number 329. Socket 317 is identified by source socket anchor 323, a source port number 331, a destination port number 333, and a destination port number 335. Socket 321 is identified by source socket anchor 323, a source port number 337, a destination socket anchor 339, and a destination port number 341. Transport layer 309 strips TCP header 417 from TCP segment 415 to yield data 421. Transport layer 309 forwards data 421 to a socket 313, 317, or 321 according to source socket anchor 323 and source port number 325, 331, or 337.

FIG. 5 illustrates a TCP header 500 according to one embodiment of the present invention the present invention. TCP header 500 contains ten mandatory fields and optional options extensions. The ten mandatory fields are source port 501, destination port 502, sequence number 503, acknowledgement number 504, data offset 505, reserved 506, flags 507, window size 508, checksum 509, and urgent pointer 510. The options extensions is a multiple of thirty-two from 0 to 320 bits in length, as determined by data offset field 505.

According to embodiments of the present invention, the options extensions include socket anchor information. An 8-bit kind field 511 identifies the option kind as socket anchor. TCP currently specifies several kind codes. Any unassigned kind code may be used to specify socket anchor. An 8-bit length field 512 specifies the length of a socket anchor. In some embodiments, the socket anchor is a 128-bit number. A 16-bit IP-association field 513 indicates if the socket anchor is source socket anchor or a destination socket anchor. The next field 514 contains the 128-bit source socket anchor itself. Following field 514 is another kind field 515, which again identifies to option kind as socket anchor. A length field 517 defines the length of the following socket anchor. An IP-association field 518 identifies the following socket anchor as a destination socket anchor. Finally, a field 519 contains the 128-bit destination socket anchor itself.

The options extension of a TCP header may have a maximum of three hundred twenty bits. Since the options extension of the embodiment of FIG. 5 comprises three hundred twenty bits, there is no room for other options in TCP header 500. In other embodiments, a socket anchor may have fewer than one hundred twenty-eight bits in order that other TCP options may be included.

In alternative embodiments, socket anchor identifying information may be carried in the Internet layer IP header rather than in the transport layer TCP header. Referring to FIG. 6, an Internet Protocol version 4 (IPv4) header 600 according to an alternative embodiment of the present invention is illustrated. IP header 600 has twelve mandatory fields and optional options extensions. The twelve mandatory fields are version 601, header length 620, differentiated services 603, total length 604, identification 605, flags 606, fragment offset 607, time to live 608, protocol 609, header checksum 610, source IP address 611, and destination IP address 612.

Header length 620 is a 4-bit field that specifies the number of 32-bit words in header 600. The minimum header length is five, and the maximum header length is fifteen. Thus, ten 32-bit words are available for options extensions. Protocol 609 is an 8-bit field that specifies the protocol used in the data portion of the IP datagram, which according to embodiments of the present invention may TCP or UDP.

According to embodiments of the present invention, the options extensions include socket anchor information. An 8-bit kind field 613 identifies the option kind as socket anchor. IP currently specifies several kind codes. Any unassigned kind code may be used to specify socket anchor. An 8-bit length field 614 specifies the length of a socket anchor. A 16-bit IP-association field 615 indicates if the socket anchor is source socket anchor or a destination socket anchor. The next field 616 contains the 128-bit source socket anchor itself. Following field 616 is another kind field 617, which again identifies to option kind as socket anchor. A length field 618 defines the length of the following socket anchor. An IP-association field 619 identifies the following socket anchor as a destination socket anchor. Finally, a field 620 contains the 128-bit destination socket anchor itself.

IPv4 specifies an end of options list (EOL) option, which marks the end of the options. However, the EOL is required only when the end of the options list does not coincide with the end of the header. Since, in the embodiment FIG. 6, the options comprise three hundred twenty bits, no EOL is required. In other embodiments, a socket anchor may have fewer than one hundred twenty-eight bits in order that other IP options may be included.

Figure 8:
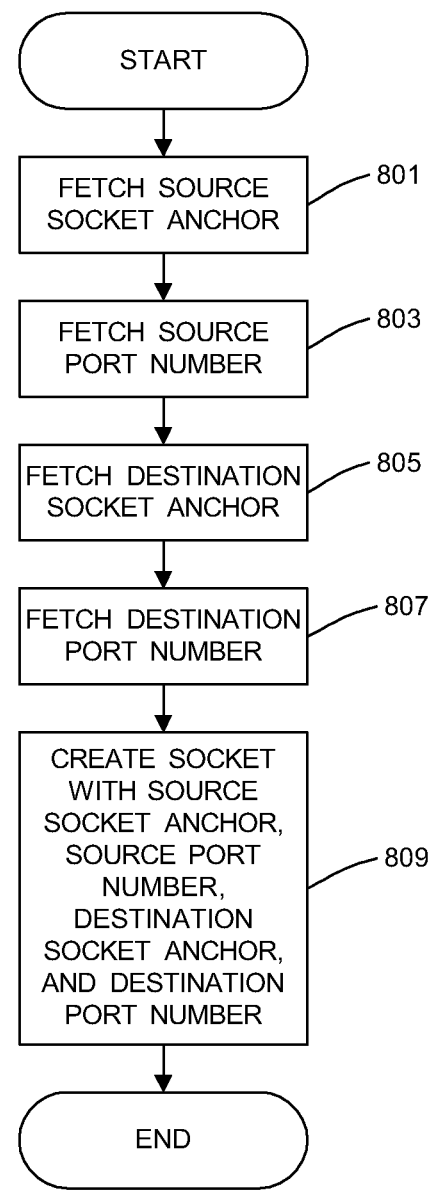
FIG. 8 is a flowchart of an embodiment of socket creation according to the present invention.

FIG. 8 is a flowchart of an embodiment of a process for generating a socket anchor according to the present invention. A socket anchor is preferably a globally unique number. In one embodiment, a socket identifier is a 128-bit number. Embodiments generate a socket anchor by concatenating a globally unique number, such as a hardware or software part or license number of a component of the machine associated with the socket, with enough randomly generated bits to make a 128-bit number. In the example of FIG. 8, the process obtains the 48-bit MAC address of Ethernet adapter 203, as indicated at block 801. Then the process generates an 80-bit random number, as indicated at block 803. Finally, the process concatenates the MAC address with the random number, as indicated at block 805.

FIG. 8 is a flowchart of an embodiment of a socket identification process according to the present invention. The process fetches the source socket anchor at block 801. The process fetches the source port number at block 803. The process fetches a destination socket anchor at block 805. The process fetches the destination port number at block 807. Then the process creates the socket with the source socket anchor, the source port number, the destination socket anchor, and the destination port number at block 809.

Figure 9A:
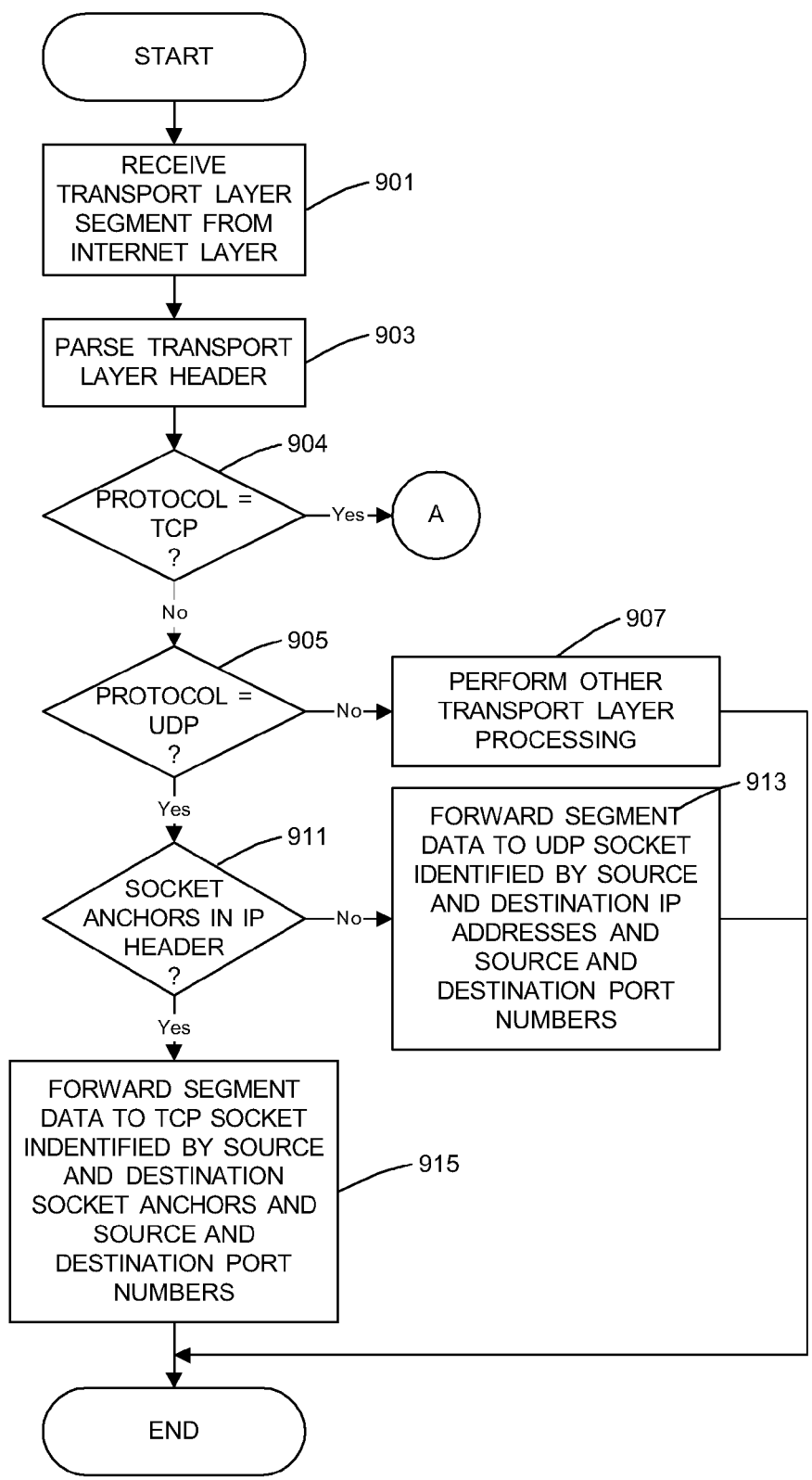
FIGS. 9A-B comprise a flowchart of an embodiment of inbound packet processing according to the present invention; and, FIG. 10 is a block diagram of a computing device in which features of the present invention may be implemented.
Figure 9B:
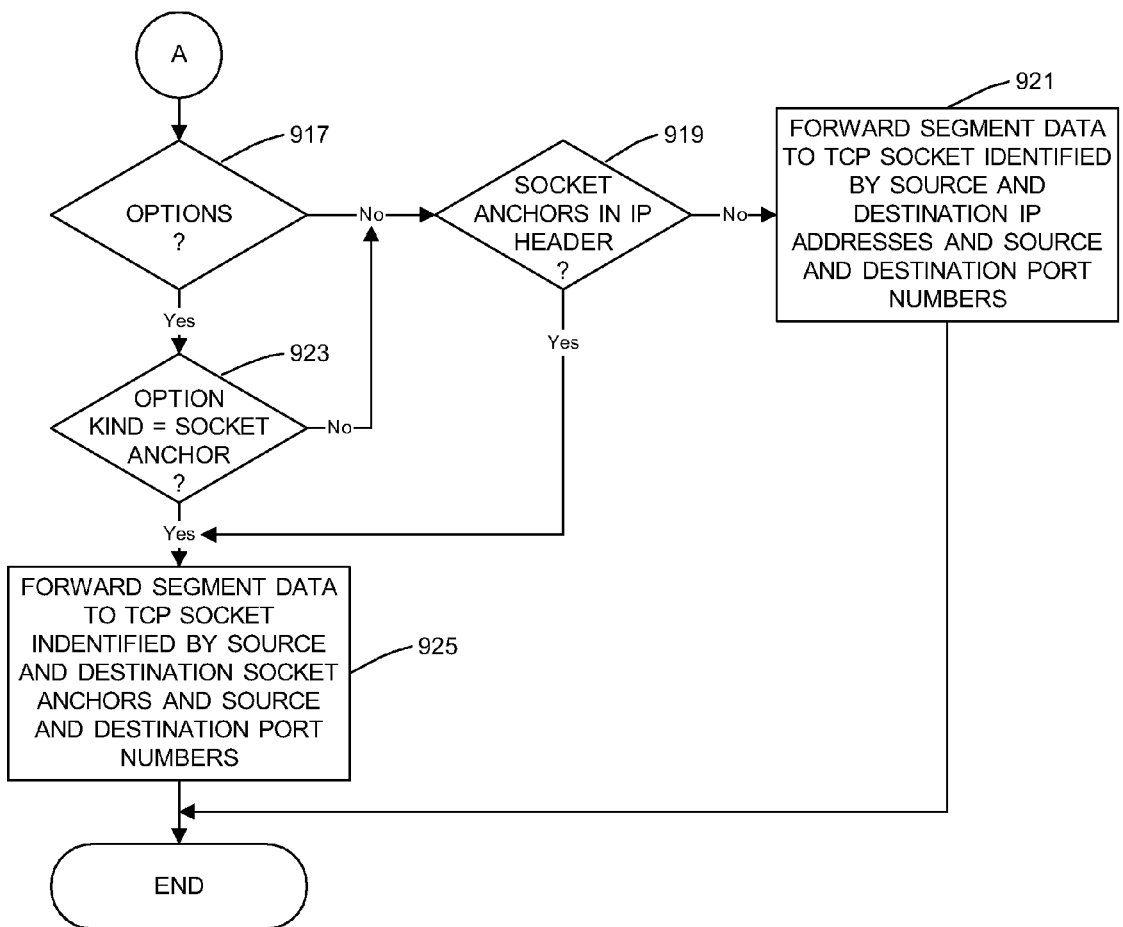

FIGS. 9A-B comprise a flowchart of an embodiment of transport layer processing according to the present invention. The transport layer receives a TCP segment from the Internet layer, as indicated at block 901. The transport layer parses the TCP header, as indicated at block 903. The transport layer determines, at decision block 904, if the transport layer protocol is TCP. If the transport layer protocol is TCP, processing proceeds to FIG. 9B. If, as determined at decision block 904, the transport layer protocol is not TCP, the transport layer determines, at decision block 905, if the transport layer protocol is UDP. If not, the transport layer performs other processing, as indicted at block 907. If the transport layer protocol is UDP, the transport layer determines, at decision block 911, if there are socket anchors in the IP header. If not, the transport layer forwards the segment data to the UDP socket identified by the source and destination IP addresses of the IP header, and the source and destination port numbers of the UDP header, as indicated at block 913. If there are socket anchors in the IP header, the transport layer forwards the segment data to the UDP socket identified by the source and destination socket anchors of the IP header, and the source and destination port numbers of the UDP header, as indicated at block 915.

Returning to decision block 904, if the transport layer protocol is TCP, processing proceeds to FIG. 9B. Referring to FIG. 9B, the transport layer determines, at decision block 917, if there are options in the TCP header. If not, the transport layer determines, at decision block 919, if there are socket anchors in the IP header. If not, the transport layer forwards the segment data to the TCP socket identified by the source and destination IP addresses of the IP header, and the source and destination port numbers of the TCP header, as indicated at block 921.

Returning to decision block 917, if there are options in the TCP header, the transport layer determines, at decision block 923, if the option kind is socket anchor. If not, processing proceeds to decision block 919. If the option kind is anchor socket, the transport layer forwards the segment data to the TCP socket identified by the source and destination socket anchors and the source and destination port numbers of the TCP header, as indicated at block 925.

A machine can generate one to few socket anchors in the same way that a machine may have one to few IP addresses. A socket anchor identifies a socket on a machine and not any particular interface of the machine. Accordingly, a socket anchor has no address function. A socket anchor is not used to route packets; it is a unique number that is used as socket identifier. Socket anchors are used in a socket tuple as unique numbers representing the source and destination ends of a socket connection. Machines on each end of a socket connection generate socket anchors. While strict global uniqueness is desired, it is not mandatory. A machine can use a particular socket anchor permanently, or it may generate new socket anchors periodically. A machine can generate a socket anchor using any globally unique hardware or software part or serial number (e.g. adapter, disks, or cpu serial numbers, or software license numbers) that is associated with the machine.

Figure 10:
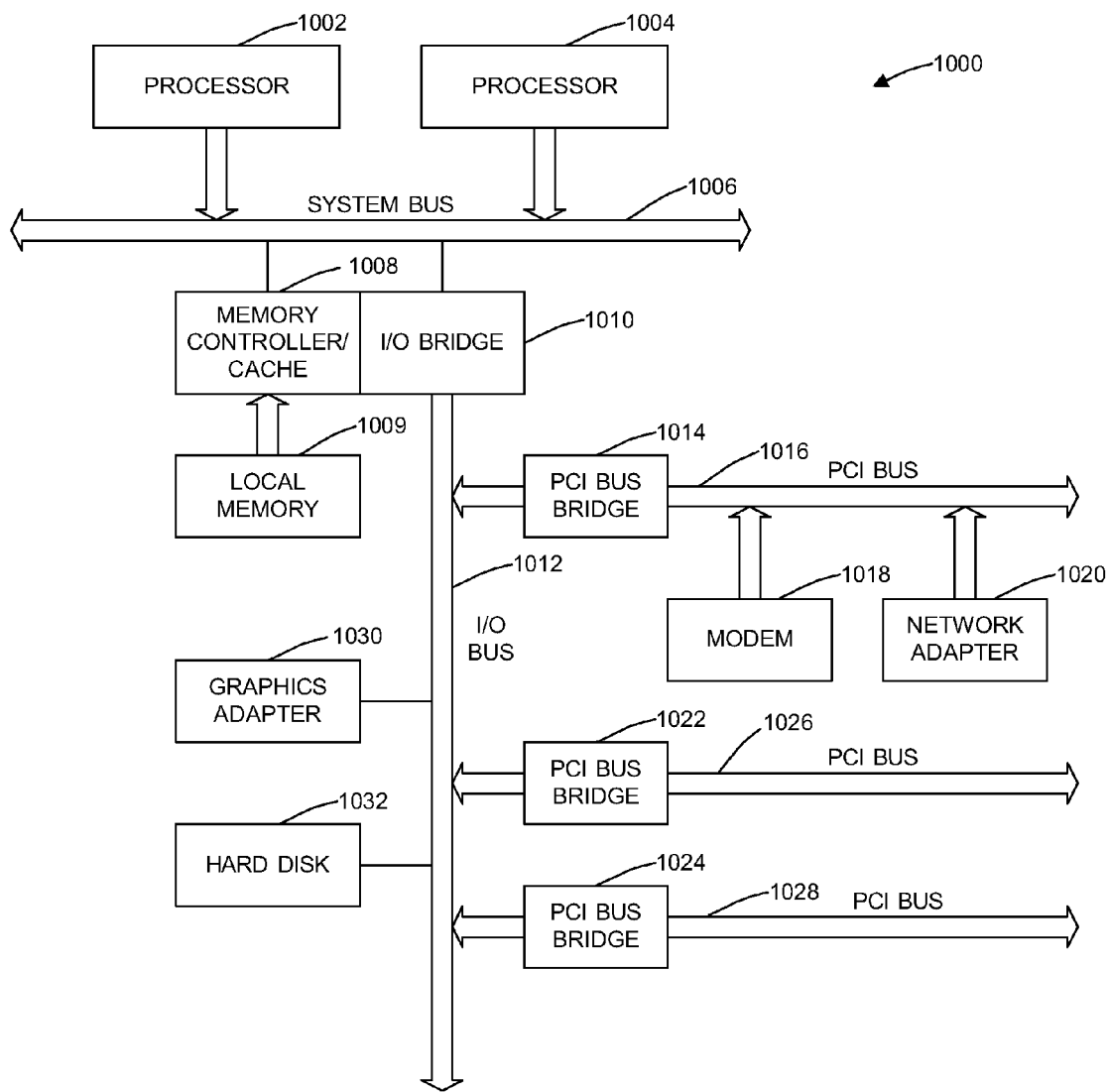

FIG. 10 is a block diagram of a data processing system that may be implemented as a host system, such as host system 105 in FIG. 1. Data processing system 1000 may be a symmetric multiprocessor (SMP) system including a plurality of processors 1002 and 1004 connected to system bus 1006. Alternatively, a single processor system may be employed. Also connected to system bus 1006 is memory controller/cache 1008, which provides an interface to local memory 1009. I/O bus bridge 1010 is connected to system bus 1006 and provides an interface to I/O bus 1012. Memory controller/cache 1008 and I/O bus bridge 1010 may be integrated as depicted.

Peripheral component interconnect (PCI) bus bridge 1014 connected to I/O bus 1012 provides an interface to PCI local bus 1016. A number of modems may be connected to PCI local bus 1016. Typical PCI bus implementations will support four PCI expansion slots or add-in connectors. Communications links to networks 101 or 103 in FIG. 1 may be provided through modem 1018 and network adapter 1020 connected to PCI local bus 1016 through add-in boards. Additional PCI bus bridges 1022 and 1024 provide interfaces for additional PCI local buses 1026 and 1028, respectively, from which additional modems or network adapters may be supported. In this manner, data processing system 1000 allows connections to multiple network computers. A memory-mapped graphics adapter 1030 and hard disk 1032 may also be connected to I/O bus 1012 as depicted, either directly or indirectly.

Those of ordinary skill in the art will appreciate that the hardware depicted in FIG. 10 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 10 may be, for example, an IBM® eServer™ pSeries system, a product of International Business Machines Corporation in Armonk, N.Y., running the Advanced Interactive Executive (AIX™) operating system or LINUX operating system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A system, which comprises:
   a machine;
   a network interface associated with said machine;
   a network socket on said machine, said network socket being identified by a non-IP address socket anchor and a port number;
   a protocol stack running on said machine, said protocol stack including a transport layer, wherein the transport layer header further comprises a transport layer protocol header comprising an options extension, the options extensions including socket anchor information comprising an 8-bit length field that specifies the length of the socket anchor, a 16-bit internet protocol-association field that indicates if the socket anchor is a source socket anchor or a destination socket anchor, and a next field containing a 128-bit source socket anchor, said transport layer being configured to:
   receive a packet, said packet including data, and said packet including said socket anchor and said port number, wherein said packet includes a transport layer header and said socket anchor and said port number are carried in said transport layer header; and,
   forward said data to said network socket.

2. The system as claimed in claim 1, wherein said socket anchor comprises a globally unique number.

3. The system as claimed in claim 1, wherein:
   said socket anchor comprises a number having a preselected number of bits.

4. The system as claimed in claim 3, wherein said number having said preselected number of bits comprises:
   a selected number associated with said machine, said selected number having a number of bits fewer than said preselected number of bits; and,
   a number of randomly generated bits concatenated with said selected number, wherein the number of bits of said selected number plus said number of randomly generated bits is equal to said preselected number of bits.

5. The system as claimed in claim 4, wherein said selected number associated with said machine comprises a Media Access Control (MAC) address of said network interface.

6. The system as claimed in claim 1, wherein said packet comprises a Transmission Control Protocol (TCP) segment.

7. The system as claimed in claim 1, wherein said socket anchor is carried as an option in an Internet Protocol (IP) header.

8. A computer readable storage device embodied with a computer program product, comprising computer executable instructions:
   instructions stored in said computer readable storage device for receiving a packet, said packet including data, and said packet including a non-IP address socket anchor and a port number, wherein said packet includes a transport layer header and said socket anchor and said port number are carried in said transport layer header, wherein the transport layer header further comprises a transport layer protocol header comprising an options extension, the options extensions including socket anchor information comprising an 8-bit length field that specifies the length of the socket anchor, a 16-bit internet protocol-association field that indicates if the socket anchor is a source socket anchor or a destination socket anchor, and a next field containing a 128-bit source socket anchor; and
   instructions stored in said computer readable storage device for forwarding said data to a socket, said socket being identified by said socket anchor and said port number.

9. The computer readable storage device as claimed in claim 8, wherein said socket anchor comprises a globally unique number.

10. The computer readable storage device as claimed in claim 8, wherein: said socket anchor comprises a number having said preselected number of bits.

11. The computer readable storage device as claimed in claim 10, wherein said number having said preselected number of bits comprises:
    a selected number associated with a machine, said selected number having a number of bits fewer than said preselected number of bits; and,
    a number of randomly generated bits concatenated with said first selected number, wherein the number of bits of said selected number plus said number of randomly generated bits is equal to said preselected number of bits.

12. The computer readable storage device as claimed in claim 11, wherein said selected number associated with said machine comprises a Media Access Control (MAC) address of a network interface associated with said machine.

13. The computer readable storage device as claimed in claim 8, wherein said packet comprises a Transmission Control Protocol (TCP) segment.

14. The computer readable storage device as claimed in claim 8, wherein said socket anchor is carried as an option in an Internet Protocol (IP) header.

* * * * *